INVENTOR
Burton H. Locke

Patented Nov. 22, 1949

2,488,871

UNITED STATES PATENT OFFICE 2,488,871

VARIABLE-SPEED DRIVE

Burton H. Locke, Framingham, Mass.

Application October 12, 1948, Serial No. 54,045

6 Claims. (Cl. 74—230.17)

This invention relates to improvements in variable speed drives that transmit infinite variable speed intermediate a pair of shafts; and designs to afford a wide range of infinite adjustable variable speed by means of an adjustable V-belt drive arranged in cooperation with a set of change gears.

One object of the present invention is to set forth an improvement of the invention set forth in my application filed October 7, 1946, Serial No. 701,829. The main object of this invention is the same as that set forth in the said application, i. e., to provide a transmission capable of transmitting constant horsepower over an infinitely adjustable speed range.

Another object is to afford a unit capable of design to deliver wide ranges of infinitely adjustable variable speed at constant horsepower, as required, from a constant speed input. Another object is to afford a unit that is relatively compact in size and simple to adjust.

Another object is to afford a unit that is an improvement over that set forth in the said prior application in that the weight of the motor is utilized to effect counteraction of the pressure of the belt on the idler pulley and thus facilitate the adjustment of the V-belt drive and the retention of the same in operating position; and wherein the gear unit is mounted stationary rather than being pivotally mounted so that the gear shifting lever will be maintained at a constant location at all speed adjustments of the V-belt drive to facilitate manipulation thereof.

The main objective is accomplished by the utilization of an adjustable V-belt drive wherein the speed of the belt remains constant at all delivered speeds of the transmission, and to provide a means that functions correlatively with the speed adjustment thereof to increase the normal V-belt wrap on the pulleys as the adjustable pulley is decreased in diameter, thereby maintaining proper belt speed and ample belt contact with the pulleys at all adjustments of the drive to render the V-belt drive capable of transmitting constant horsepower at all adjusted speeds of the transmission.

The objective of wide speed range is accomplished by properly utilizing speed change gears in cooperation with the adjustable V-belt drive to afford wide ranges of infinite adjustable variable transmitted speeds. The objective of compactness is afforded by the V-belt drive being confined within a relatively narrow range, generally approximately 2 to 1, necessary to cover only the range of speed intermediate the steps of speeds afforded by the change gears.

The objective of improvement over my said prior application is accomplished by mounting the motor to be swung in an arc that will vary the axis distance of the V-belt drive thereby effecting adjustment thereof and mounting the gear unit stationary instead of the opposite as set forth in said application. The present arrangement permits alignment of the drive and driven shafts of the transmission gear unit which affords the transmission of power directly through the unit, at the maximum transmitted speed thereof, by interconnection of the said shafts. This eliminates the transmission of power by gears and eliminates vibration and noise at the high speed of transmission which, obviously, is where the gearing would develop maximum vibration and noise if power was transmitted thereby.

The speed changes in adjustable V-belt drives now on the market are accomplished by varying the diameter of the driving pulley, either by itself by changing the center distance of the drive, or in cooperation with a change in diameter of the driven pulley in units wherein the center distance of the drive is fixed. Such drives are only capable of substantially transmitting constant torque, due to the change in the speed of the V-belt and its area of contact with the driving pulley, both of which are relative to the transmitted speed of the transmission.

The drive combination to be set forth can be adapted to deliver constant horsepower over a wide range of speed and would be ideally suited to drive machine tools, and the like, wherein constant horsepower is essential over wide ranges of speed.

The accompanying drawings show my improved drive in its simplest form and as it could be mounted on the top of a machine tool, such as a lathe or milling machine for example. However, it is obvious that the drive could be adapted for other uses, if desired.

Figure 1:
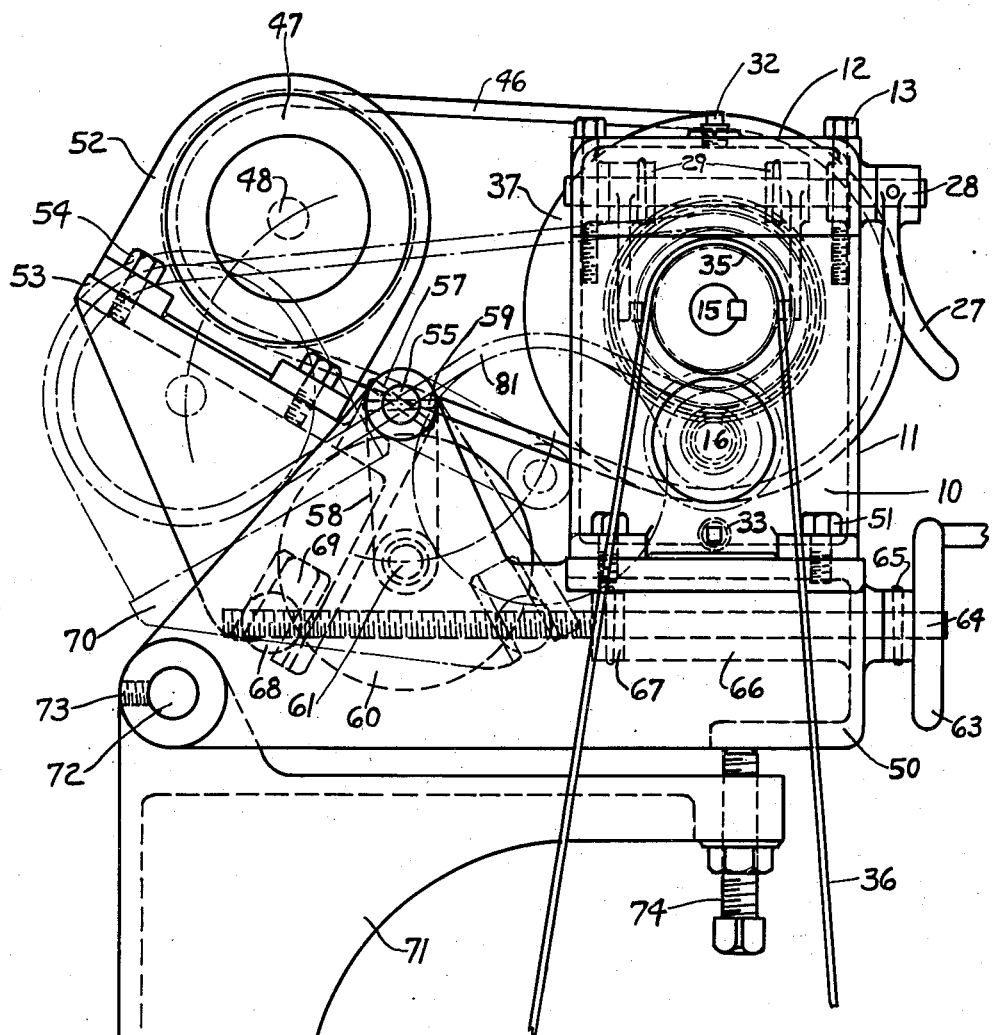
Figure 1 is a side elevation of my improved variable speed drive arrangement.
Figure 2:
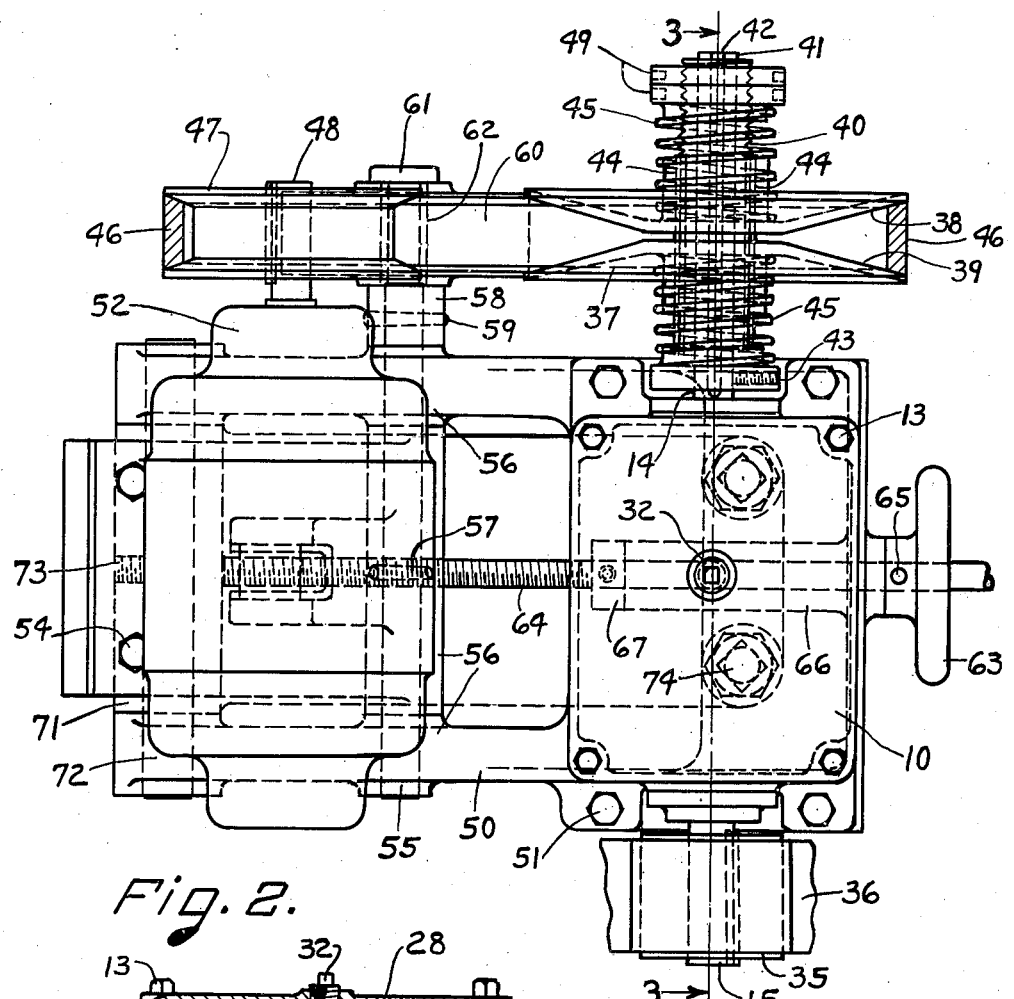
Figure 2 is a plan view of the same.
Figure 3:
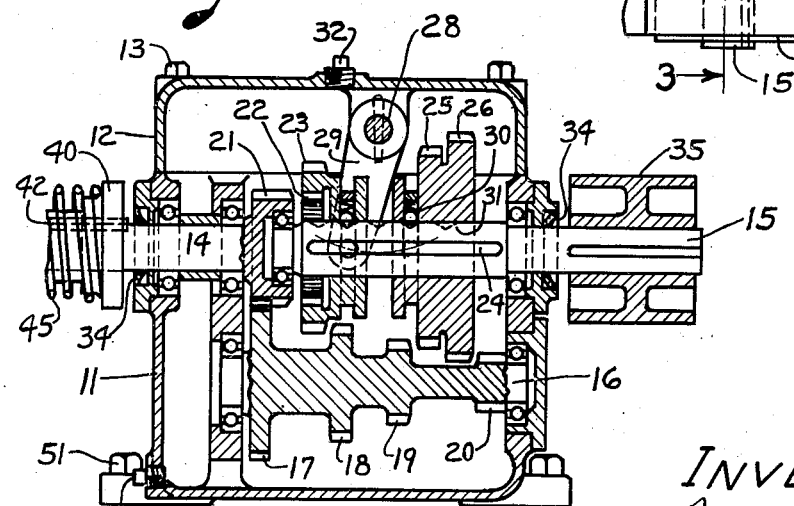
Figure 3 is a sectional view taken on line 3—3, of Figure 2, to show in a general way the mechanism within the gear transmission.

My improved variable speed drive comprises a selective speed gear transmission 10 which is composed of a casing consisting of a main portion 11 having a cover portion 12 secured thereto by means of removable cap screws 13 to afford accessibility to the inside mechanism. A drive shaft 14 and a driven shaft 15 are mounted in journaled alignment in casing 11 and a countershaft 16, comprising a plurality of different sizes of gears 17, 18, 19, and 20, is journaled in parallelism therewith. A gear 21 is integral with the inner end of drive shaft 14 and is in constant mesh with gear 17 to impart motion to countershaft 16 whenever drive shaft 14 is rotated. A combined internal gear 22 and external gear 23 are slidably mounted on driven shaft 15 and are caused to rotate therewith by a key 24; or a plurality of keys or splines could be provided, if such construction is desired. An integral structure of gears 25 and 26 are also slidably mounted on shaft 15 and are rotated therewith by key 24. Any gear on shaft 15 can be slid into operating position with its mating gear on countershaft 16, to effect a certain select speed to shaft 15, by means of a conventional shifter lever 27 positioned outside of the casing through the medium of a shaft 28 and levers 29 attached thereto within the casing, all of which is obvious and thus does not require further explanation.

The gears are held either in neutral or in mating position by a spring loaded ball 30 housed in each sliding gear structure which engages one of the plurality of recesses 31 provided in shaft 15, respectively. Internal gear 22 is adapted to be slid onto the outer end of gear 21, on drive shaft 14, to couple the drive shaft 14 to the driven shaft 15 for the purpose of transmitting the motion directly through the transmission at the highest selective delivered speed thereof and thereby eliminate the use of gearing to transmit the power, such as is required in the embodiment set forth in my prior mentioned application. This feature afforded in the present invention is an improvement over the embodied invention set forth in said application for reason that vibration and noise is eliminated at the high transmitted speed, which is where the same is major, by the elimination of the transmission of the power through the gearing. Another improvement afforded by the present invention is the maintenance of the gear shifting lever at the same location at all speed adjustments. This facilitates grasping the lever for manipulation and this improvement is afforded by reason that the gear case is mounted in a fixed position instead of being pivoted as in the said prior invention.

Another improvement afforded by the present invention over the arrangement set forth in my prior application is that greater belt wrap can be effected on the adjustable pulley by the present embodiment by reason that idler pulley 60 swings eccentric to the said adjustable pulley and thereby is swung nearer the axis of the same, which effects increased wrap on the pulley, as the pulley is adjusted smaller in diameter. In the prior application, the idler is swung concentric with the adjustable pulley and is thereby retained a constant distance from the same which, obviously, would have to be outside of the periphery of the pulley for proper operation. Thus the amount of belt wrap that can be obtained is limited for reason that the idler cannot be swung within the adjustable pulley as is permissible in the present invention.

The transmission case is generally partially filled with oil to lubricate the interior gearing and bearings and plugs 32 and 33 are provided for the purpose of adding and draining the oil, respectively. Oil seals 34 are provided on the shafts to prevent oil escaping from the casing.

Driven shaft 15 extends outside of the casing on one side thereof, and in this instance supports a pulley 35 which drives down to a pulley on a machine by means of a flat belt 36. Drive shaft 14 extends outside of the casing on the opposite side to receive an adjustable V-belt pulley 37 which comprises two opposing cone faced discs 38 and 39 slidably mounted on a sleeve 40 which is fastened to the extended end 41, of shaft 14, by means of key 42 and set screw 43, and held to rotate therewith by means of keys 44. The discs 38 and 39 are actuated toward each other by means of compression springs 45 to cooperate with a V-belt 46 operating over, and driven at constant speed by, a fixed diameter pulley 47 mounted on a motor shaft 48. Springs 45 are adjusted to proper operating condition by means of adjusting nuts 49 which have threaded engagement with sleeve 40.

The gear transmission 10 is rigidly mounted in fixed position on a base 50 by means of cap screws 51. A motor 52 is mounted on a bracket 53 by means of cap screws 54 and bracket 53 is pivotly mounted to base 50, to swing motor 52 eccentric with the transmission 10, by means of a hinge shaft 55 extending through bosses 56 provided on said bracket and said base and being held to pivot with said bracket by means of a taper pin 57 provided through the shaft 55 and the boss 56 of said bracket 53.

Hinge shaft 55 extends outward from said base to support an arm 58 which is secured to said shaft by means of a taper pin 59. Arm 58 extends downward to support an idler pulley 60 which is rotatively mounted to said arm by means of a stud 61 secured in said arm, and a bearing sleeve 62 is provided. Obviously, arm 58 will swing idler pulley 60 into contact with the back of V-belt 46 when the motor 52 is swung by the pivoting of bracket 53. The purpose of the idlers is to contact the back of the V-belt as the motor is swung, thereby increasing the normal belt wrap on the adjustable pulley as said pulley is decreased in diameter by the swinging of the motor. This affords increasing belt wrap on the pulley as the pulley is decreased in diameter and therefore affords, substantially, ample belt contact with the said pulley at the smaller diameters thereof to transmit constant horsepower. By this arrangement the idler pulley 60 increases the belt wrap on the adjustable pulley substantially correlative to the decrease in diameter of said pulley as it becomes adjusted smaller in diameter than the drive pulley 17, which is the point where abnormal belt wrap becomes essential to the transmission of constant horsepower.

The position of the idler pulley 60 when most useful, which is effected and essential when adjustable pulley 37 is at its minimum diameter, is shown by broken circle 81. The spring pressure against the cone discs 38 and 39 increases as the diameter of the adjustable pulley 37 decreases. This affords increasing belt friction with the said pulley, substantially coactive in effect, to further assure the drive of transmitting constant horsepower at all speed adjustment.

The pivoting of bracket 53, and thus the swinging of motor 52 and idler 60 is accomplished by a handwheel 63 attached to a screw 64 by means of a taper pin 65. Screw 64 is freely mounted in a boss 66, provided on base 50, and is retained from longitudinal axial movement therein by means of abutment of said handwheel against one end of said boss and a collar 67, pinned to said screw, abutting the other end of said boss. Screw 64 extends inward and has threaded engagement with a circular shaped nut 68 which is slidably mounted in a slot 69 provided in bracket 53. A turning of handwheel 63 causes nut 68 to travel laterally on screw 64 and thus effects and controls the pivoting of the bracket 53. Bracket 53 is shown in its maximum swung position by broken lines 70.

A pivoting of bracket 53 will swing motor 52 eccentric with drive shaft 14, of the transmission, and will thus vary the axial spacing of the motor shaft 48 from that of the transmission shaft 14 and thereby cause the V-belt 46 to travel on a smaller or larger diameter of the adjustable pulley 37 which will afford the transmission of infinite variation of speed to the transmission shaft 14 by the motor.

It would appear that a drive shaft could be mounted on the pivoted bracket 53 in place of motor 52 and the fixed diameter pulley mounted thereon without departing from the invention if in such construction this said drive shaft was driven at constant speed from a source of power.

A fixed diameter flat face pulley to operate on the inside face of the V-belt 46 could be used in place of V-pulley 47 without departing from the scope of the invention.

As shown in the drawing, I have conceived to dispose the pivot of bracket 53 relative to the mounting of the motor 52 and the idler 60 so that the weight of the motor is utilized in effecting counteraction of the pressure of the V-belt against the said idler. This affords ease in adjusting the drive and retaining the same in proper operating position at all settings thereof.

In some constructions it might be possible to eliminate the idler and still transmit constant horsepower, if the driven adjustable pulley was permitted in such constructions to be constructed relatively large so that it would not be adjusted smaller in diameter than the drive pulley.

The drawing shows a useful mounting arrangement of my drive to a machine wherein there is a bracket 71 attached to the machine and base 50 is pivotly mounted thereon by means of a hinge pin 72 which is held in said bracket by a set screw 73. Adjusting screws 74, having threaded engagement in bracket 71, are provided to afford a means of pivoting base 50 relative to bracket 71 and thereby adjust the operating tension on belt 36 which drives from pulley 35 on the transmission driven shaft 15 down to the pulley on the machine. However, whereas this application appears novel in combination with my variable speed drive, I do not wish to be confined to this particular application.

It is obvious that an infinite speed variation can be obtained over the entire speed range of the transmission by proper manipulation of the change gears in cooperation with the adjustable V-belt drive, and that a wide range of speed can be obtained by the combined arrangement set forth and the transmission of constant horsepower over the entire speed range can be substantially afforded.

In transmissions requiring only a small range of speed variation, the plurality of change gears shown could be eliminated and a single pair of gears employed to transmit the motion through the transmission besides the shafts of the transmission being arranged to be interconnected.

The exact details are susceptible of modification without departing from the spirit or scope of the invention which is set forth in the following claims.

I claim:

1. A variable speed drive comprising a base, a selective speed gear transmission, having a drive and driven shaft and a plurality of change gears intermediate said shafts, mounted in fixed position on said base, a motor mounted on said base to swing eccentric to the drive shaft of said transmission, a fixed diameter pulley on said motor, a spring actuated adustable V-pulley on the drive shaft of said transmission, a V-belt operatively connecting said pulleys, means to positively effect and control the swinging of said motor and thereby vary the axial spacing of said pulleys and thereby cause the said belt to travel on a smaller or larger diameter of the adustable pulley to effect speed adjustment intermediate the said motor and said transmission, an idler mounted to be swung with the swinging of said motor and disposed to contact the back of said belt as the motor is swung to decrease the diameter of said adjustable pulley, the purpose of said idler being to increase the normal belt wrap on the adjustable pulley as the said pulley is decreased in diameter.

2. A variable speed drive comprising a base, a selective speed gear transmission, having a drive and a driven shaft and a plurality of change gears intermediate said shafts, mounted in fixed position on said base, a power means mounted on said base to swing eccentric to the drive shaft of said transmission, a fixed diameter pulley on the said power means, a spring actuated adjustable V-pulley on the drive shaft of said transmission, a V-belt operatively connecting said pulleys, means to positively effect and control the swinging of said power means and thereby vary the axial spacing of said pulleys and thereby cause the said belt to travel on a smaller or larger diameter of the adjustable pulley to effect speed adjustment intermediate the said power means and said transmission, an idler mounted to be swung with the swinging of said power means and disposed to contact the back of said belt as the power means is swung to decrease the diameter of said adjustable pulley, the purpose of said idler being to increase the normal belt wrap on the adjustable pulley as the said pulley is decreased in diameter.

3. A variable speed drive comprising in combination a base, a selective speed gear transmission mounted stationary on said base, a motor mounted on the base, to swing eccentric to the transmission, to furnish the motion, a fixed diameter pulley on the motor, a pair of opposed cones yieldingly pressed toward each other on the transmission, a V-belt operating on the pulley and the cones, means to effect and control the swinging of the motor to vary the axial spacing of the pulley from that of the cones and thus cause the V-belt to travel on a larger or smaller circuit of the cones and thereby vary the motion imparted to the transmission, an idler positioned by the swinging of the motor to contact the back of the belt and thereby increase the normal wrap of the belt on the cones as the belt travelling circuit decreases, the mounting arrangement of the motor and the idler being such that the weight of the motor is utilized to effect counteraction of the pressure of the V-belt on the idler.

4. A variable speed drive comprising in combination, a base, a selective speed transmission mounted stationary on the base, a power means mounted on the base, to swing eccentric to the transmission, to furnish the motion, a fixed diameter pulley on the power means, a pair of opposed cones yieldingly pressed toward each other on the transmission, a V-belt operating on the pulley and the cones, means to effect and control the swinging of the power means to vary the axial spacing of the pulley from that of the cones and thus cause the V-belt to travel on a larger or smaller circuit of the cones and thereby vary the motion imparted to the transmission, an idler positioned by the swinging of the power means to contact the back of the belt and thereby increase the normal wrap of the belt on the cones as the belt traveling circuit decreases, the mounting arrangement of the power means and the idler being such that the weight of the power means is utilized to effect counteraction of the pressure of the V-belt on the idler.

5. Means to transmit constant horsepower at infinitely variable speeds from a drive member to a driven member comprising a fixed diameter pulley on the drive member and a pair of opposed cone discs yieldingly pressed toward each other on the driven member and a V-belt operating on said pulley and cones, one member having fixed position, the other member being disposed to be swung eccentric with the first member for the purpose of varying the spacing of the pulley from that of the cones and thereby cause the V-belt to travel on a smaller or larger circuit of the cones to vary the motion intermediate the drive and driven members, means to effect and control the swinging of the swingable memer, an idler positioned by the swingable member to contact the back of the belt to increase the normal length of belt contact on the cones as the said member is swung to effect decrease in the belt circuit on the cones.

6. Means to transmit infinitely adjustable variable motion intermediate two members comprising a fixed diameter pulley on one of said members, a pair of opposed cones yieldably pressed together on the other said member, a V-belt operatively connecting said pulley and cones, one of said members being mounted in a fixed position, the other of said members being mounted to move to change the spacing of the pulley from that of the cones and thereby cause the V-belt to travel on a smaller or larger circuit of the cones to effect changes in the motion intermediate the said members, means to effect and control the movement of the movable member, an idler arranged to be positioned by the movement of the movable member to contact the back of the belt and thereby increase the normal arcual contact of the V-belt with the cones as the circuit of the said belt on the cones is decreased.

BURTON H. LOCKE.

REFERENCES CITED

The following references are of record in the file of this patent:

UNITED STATES PATENTS

| Number | Name | Date |
|---|---|---|
| 2,075,297 | O'Brien | Mar. 30, 1937 |
| 2,092,469 | Oslund | Sept. 7, 1937 |
| 2,107,483 | Knight | Feb. 8, 1939 |
| 2,191,200 | Heyer | Feb. 20, 1940 |
| 2,372,342 | Smith | Mar. 27, 1945 |